United States Patent
Huber et al.

(10) Patent No.: US 9,162,329 B2
(45) Date of Patent: Oct. 20, 2015

(54) METHOD FOR REMOVING AN INNER CASING FROM A MACHINE

(71) Applicant: ALSTOM Technology Ltd, Baden (CH)

(72) Inventors: Tobias Christoph Huber, Waldshut (DE); Gerard Froidevaux, Neuenhof (CH); Daniel Seng, Busslingen (CH); Karsten Schwarz, Nussbaumen (CH); Ivan Rozman, Nussbaumen (CH)

(73) Assignee: ALSTOM Technology Ltd., Baden (CH)

( * ) Notice: Subject to any disclaimer, the term of this patent is extended or adjusted under 35 U.S.C. 154(b) by 227 days.

(21) Appl. No.: 14/022,608

(22) Filed: Sep. 10, 2013

(65) Prior Publication Data
US 2014/0068911 A1 Mar. 13, 2014

(30) Foreign Application Priority Data
Sep. 10, 2012 (EP) .................................... 12183648

(51) Int. Cl.
*B23P 15/04* (2006.01)
*F01D 25/28* (2006.01)
*B23P 19/06* (2006.01)
*B23P 6/00* (2006.01)

(52) U.S. Cl.
CPC .............. *B23P 15/04* (2013.01); *F01D 25/285* (2013.01); *B23P 6/002* (2013.01); *B23P 19/06* (2013.01); *F05D 2230/68* (2013.01); *F05D 2230/70* (2013.01); *Y10T 29/49318* (2015.01); *Y10T 29/49721* (2015.01); *Y10T 29/49815* (2015.01); *Y10T 29/49819* (2015.01)

(58) Field of Classification Search
CPC .................. Y10T 29/49318; Y10T 29/49721; Y10T 29/49815; Y10T 29/49819; B23P 6/002; B23P 19/06; B23P 15/04; F01D 25/24; F01D 25/243; F01D 25/26; F01D 25/265; F01D 25/285; F05D 2230/68; F05D 2230/78
USPC ........................................................ 29/426.1
See application file for complete search history.

(56) References Cited

U.S. PATENT DOCUMENTS

| | | | | |
|---|---|---|---|---|
| 5,690,469 A | * | 11/1997 | Deal et al. ...................... | 415/189 |
| 6,571,471 B2 | * | 6/2003 | Hohmann ..................... | 29/889.1 |
| 8,276,273 B2 | * | 10/2012 | Shigemoto et al. .......... | 29/889.1 |
| 2010/0034648 A1 | * | 2/2010 | Robertson .................. | 415/199.4 |

FOREIGN PATENT DOCUMENTS

| | | |
|---|---|---|
| GB | 1211313 | 11/1970 |
| JP | 2004-116379 | 4/2004 |
| JP | 2009-264379 | 11/2009 |
| JP | 2011-516776 | 5/2011 |
| WO | 2006/103152 | 10/2006 |
| WO | 2008/012195 | 1/2008 |
| WO | WO 2009054050 A1 * | 4/2009 |

* cited by examiner

*Primary Examiner* — David Bryant
*Assistant Examiner* — Lawrence Averick

(57) ABSTRACT

The method for removing an inner casing from a machine includes removing a top part of the outer casing, removing a top part of the inner casing, removing the bottom part of the inner casing, before removing the bottom part of the inner casing connecting the bottom part of the inner casing to the rotor, such that the bottom part of the inner casing is supported by the rotor, then rotating the rotor around the longitudinal axis to make the bottom part of the inner casing accessible.

11 Claims, 3 Drawing Sheets

METHOD FOR REMOVING AN INNER CASING FROM A MACHINE

CROSS-REFERENCE TO RELATED APPLICATIONS

This application claims priority to European application 12183648.0 filed Sep. 10, 2012, the contents of which are hereby incorporated in its entirety.

TECHNICAL FIELD

The present disclosure relates to a method for removing an inner casing from a machine.

The machine is in general a machine having an outer casing, and inner casing within the outer casing and a rotor within the inner casing. For example such machines are axial turbines, axial compressors, etc.

BACKGROUND

Machines such as axial turbines or compressors have an outer casing that houses an inner casing; the inner casing carries vanes. Within the inner casing a rotor is housed that carries blades.

Blades and vanes must withstand very heavy operating conditions, thus they need periodical checking and controls.

Different methods are known to access the vanes and blades.

For example the upper part of the outer casing and inner casing can be removed and then also the rotor can be removed, in order to access the vanes at the bottom part of the inner casing.

Nevertheless, removing the rotor is very time consuming, thus it is preferably avoided.

It is also known to remove the upper part of, the outer and inner casing, replace the upper part of the inner casing with a ring sector and then provide rollers between the bottom part of the outer and inner casing.

This way the bottom part of the inner casing can be rotated on the rollers, bringing it at the top of the machine, such that it can be removed without removing the rotor.

This method could cause damages between the adjacent parts of the inner and outer casing. For example, this can be caused by the possible relative axial displacement of the inner and outer casing, such that adjacent surfaces of the inner and outer casing that normally are separated by a gap come into contact.

SUMMARY

An aspect of the disclosure includes providing an alternative method to the known method that allows counteraction of damages to the adjacent surfaces of the inner and outer casing during rotation.

These and further aspects are attained by providing a method in accordance with the accompanying claims.

Advantageously, this method allows rotation of the inner casing without the need of providing supports from a static part against the inner casing (for example between the inner casing and the outer casing). These supports could deform the inner casing and thus change the relative distance between rotor and inner casing, with the risk of damaging the vanes and/or the blades and/or the stator/stator heat shields and/or the rotor/rotor heat shields.

In addition, this method allows rotation of the inner casing around the rotor axis, but the rotation is not carried out by sliding the inner casing on supports. This is advantageous, because the tolerances of the inner casing are such that during rotation (the inner casing slides on supports) the distance between rotor and inner casing can change, with the risk of damaging the vanes and/or the blades and/or the stator/stator heat shields and/or the rotor/rotor heat shields.

BRIEF DESCRIPTION OF THE DRAWINGS

Further characteristics and advantages will be more apparent from the description of a preferred but non-exclusive embodiment of the method, illustrated by way of non-limiting example in the accompanying drawings, in which.

DETAILED DESCRIPTION

Figure 1:
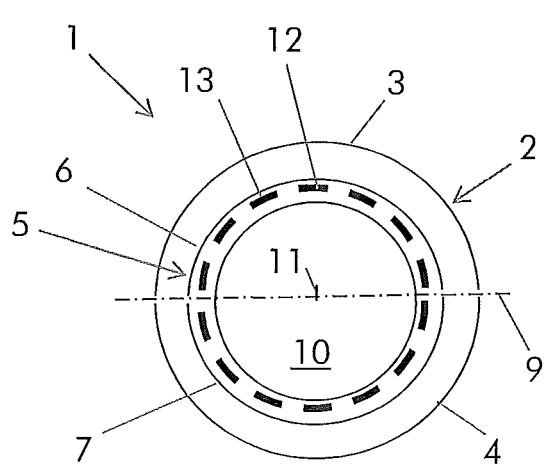
FIGS. 1 through 6 show the steps of the method.

The machine 1 is for example an axial turbine (such as a turbine of a gas turbine engine or steam turbine) or an axial compressor or a similar machine.

The machine 1 includes an outer casing 2 with a top part 3 and a bottom part 4 and an inner casing 5 with a top part 6 and a bottom part 7. The top and bottom parts 3, 6, 4, 7 of the outer and inner casings 2, 5 are divided by a horizontal axis 9; in addition the top and bottom parts 3, 6, 4, 7 are connected together for example by screws or bolts or other means.

The inner casing 5 houses a rotor 10 with a longitudinal axis 11.

The inner casing 5 has vanes 12 and the rotor 10 has blades 13.

In order to remove the inner casing 5 without removing the rotor 10 the following steps are carried out.

Figure 2:
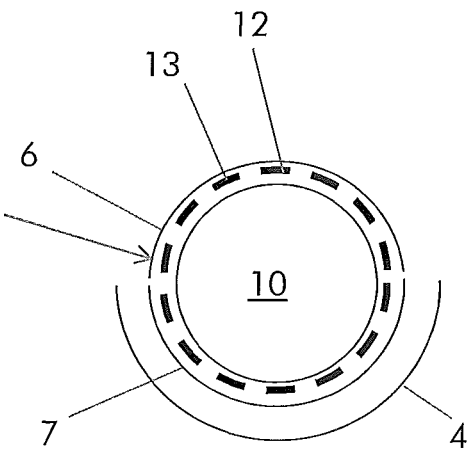
Figure 3:
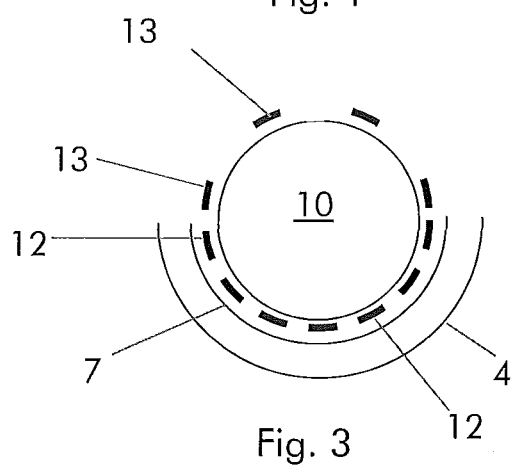
Figure 4:
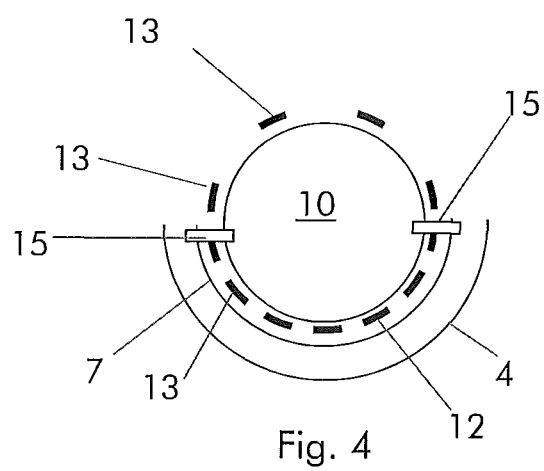
Figure 5:
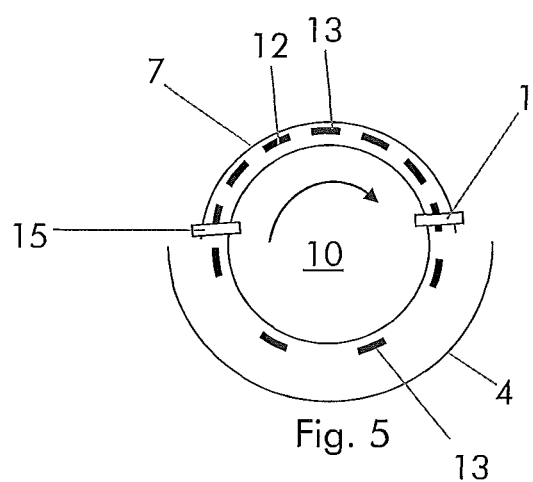
Figure 6:
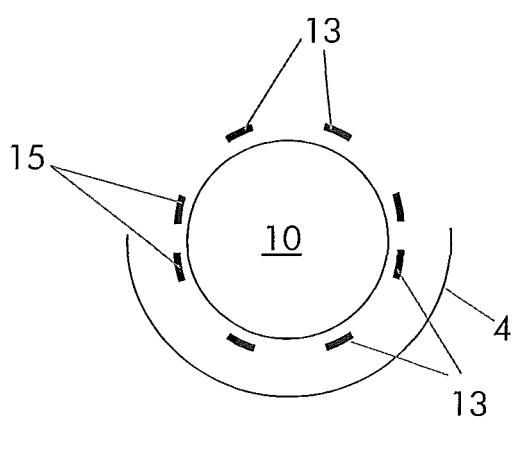

The top part 3 of the outer casing 2 is removed (FIG. 2); thus the top part 6 of the inner casing 5 is also removed (FIG. 3).

The bottom part 7 of the inner casing 5 is connected to the rotor 10 and the rotor 10 is rotated around its longitudinal axis 11 to make the bottom part 7 of the inner casing 5 accessible.

The bottom part 7 is connected to the rotor 10 before the rotor 10 is rotated, such that the bottom part 7 of the inner casing 5 is supported by the rotor 10.

Thus, the bottom part 7 of the inner casing 5 is removed.

Connecting the bottom part 7 of the inner casing 5 to the rotor 10 preferably includes providing a form fitting and/or friction connection.

Preferably, the form fitting and/or friction connection does not include clamping the rotor circumference, because this could cause damages to the rotor heat shields and/or adversely affect the rotor contour.

Figure 7:
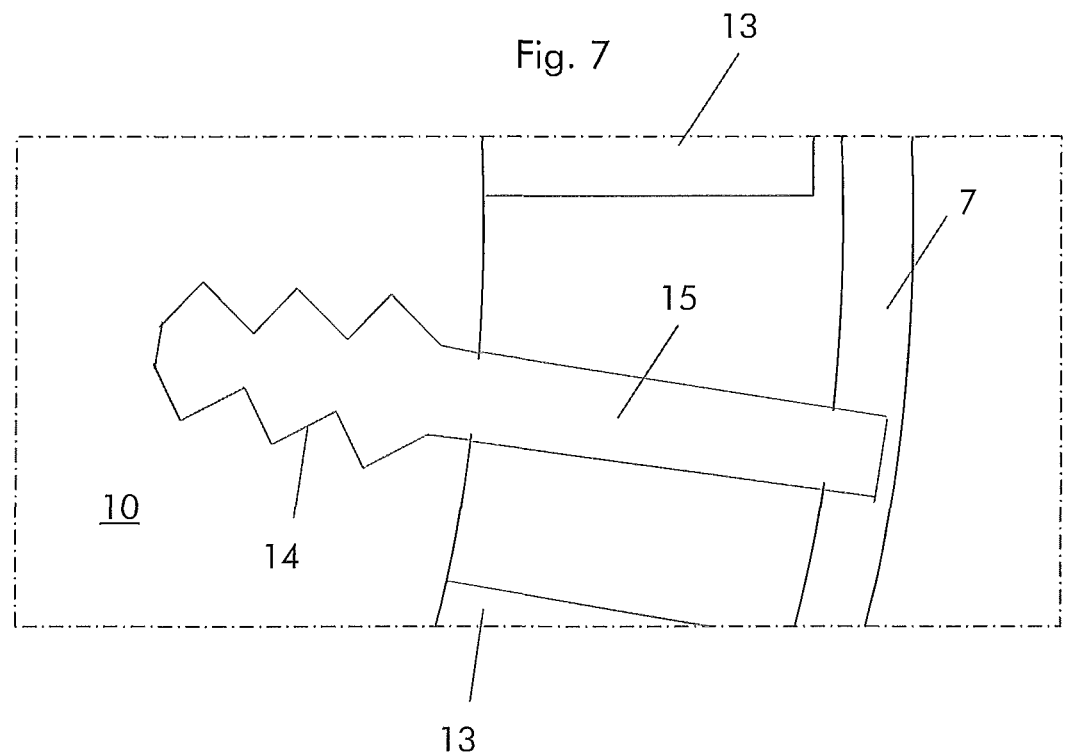
FIGS. 7 through 9 shows different embodiments of the supports.

In a first example (FIG. 7) providing a form fitting and/or friction connection includes removing at least one blade from a rotor groove 14, providing at least one support 15 having a profile at its one end corresponding to the profile of the rotor groove 14, connecting the support(s) 15 with said one end into the rotor groove 14 of the removed at least one rotor blade 13, connecting the at least one support 15 with its other end to the bottom part 7 of the inner casing 5, e.g. by a bolted connection.

Figure 8:
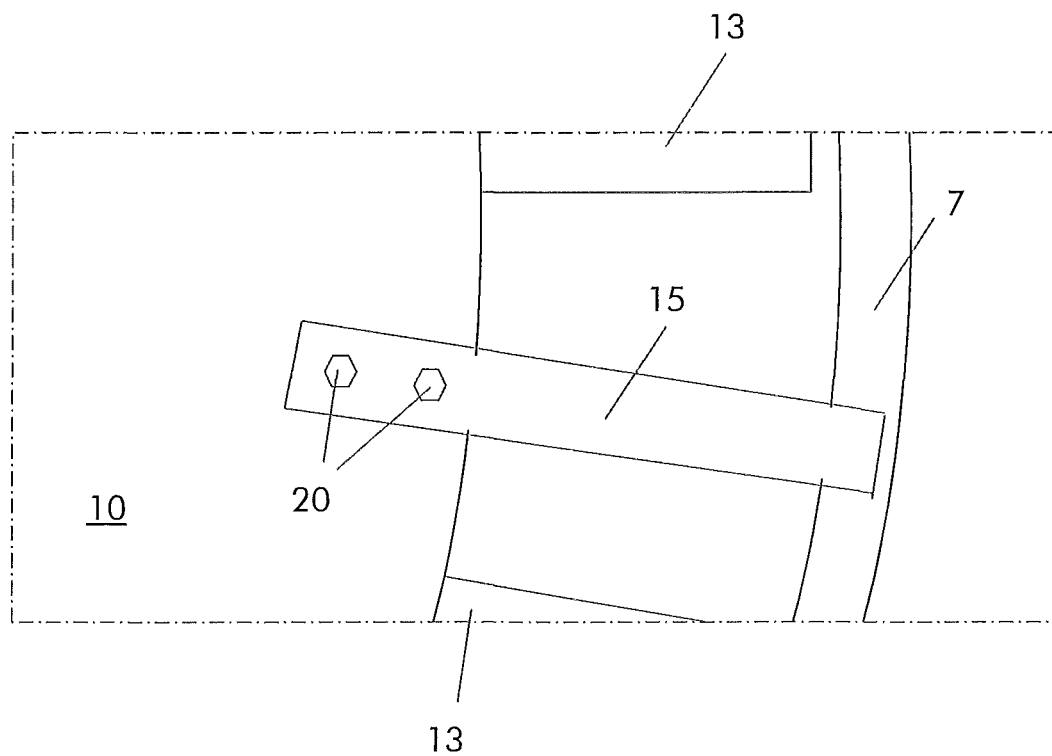
Figure 9:
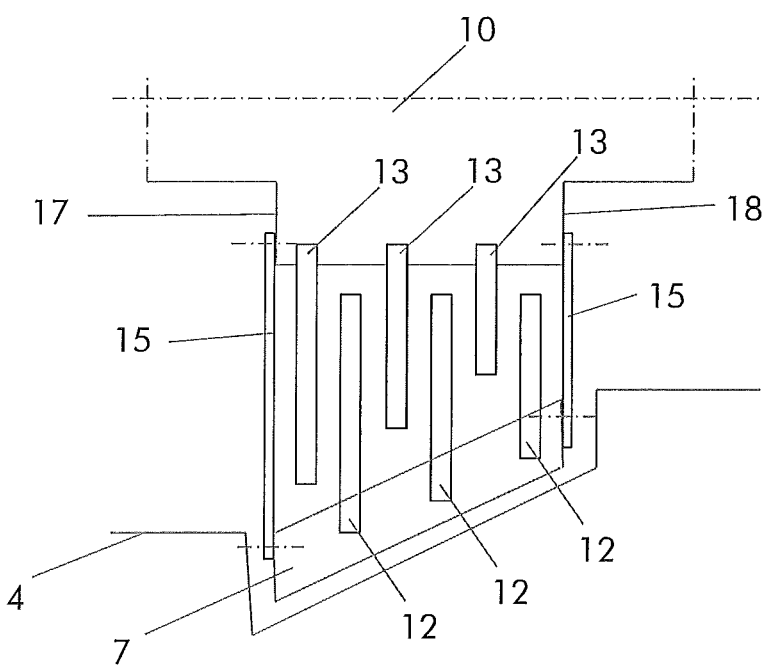
Figure 10:
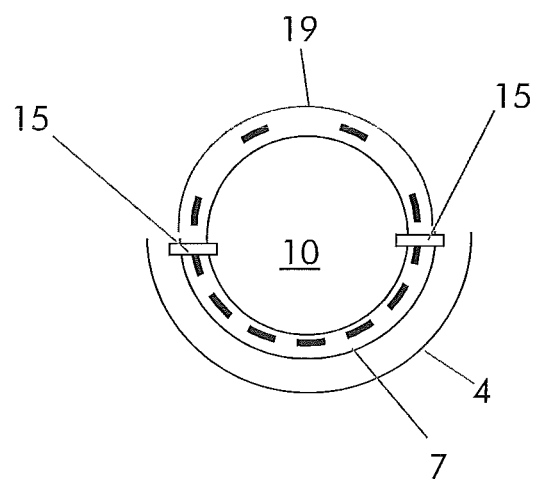
FIG. 10 shows an additional possible step of the method.

In a different example (FIG. 8), providing a form fitting and/or friction connection includes screw fitting the support(s) at least to the rotor 10; for example FIG. 8 shows the screws 20.

Screw fitting the supports 15 to the rotor 10 includes screwing the supports 15 to front and/or rear surfaces 17, 18 of the rotor 10.

Preferably two or more supports 15 are provided. For example two supports 15 at the sides of the bottom part 7 can be provided; alternatively three supports 15 can be provided, two at the sides of the bottom part 7 and one at the centre of the bottom part 7; other arrangements are anyhow possible.

In addition, even if it is not needed, a ring sector 19 can be connected to the bottom part 7 of the inner casing 5.

The ring sector 19 is preferably connected to the rotor by providing the rotor front and/or rear surfaces with circular slots and housing plates in the circular slots. Screws may also be provided that are connected to the ring sector 19 (for example they pass through apertures of the ring sectors 19) and are fixed to the plates.

The method can also include, after connecting the bottom part 7 of the inner casing 5 to the rotor 10, adjusting the position of the bottom part 7 of the inner casing 5 with respect to the rotor 10.

Adjusting the position of the bottom part 7 of the inner casing 5 preferably includes spacing the inner casing 7 from the rotor. In other words, the bottom part 7 is moved farther from the rotor.

For example, adjusting can be achieved by using supports 15 in two elements, one element connected to the rotor, another element connected to the inner casing 7 and an adjustable connection element (such as a screw and/or shims) in between.

Alternatively, when the ring sector 19 is used, adjusting can be achieved by connecting the ring sector 19 to the rotor 10 and connecting the ring sector 19 to the bottom inner casing 7 by adjustable elements, such as screws and/or shims.

Spacing the bottom part 7 of the inner casing 5 from the rotor preferably includes radially displacing the bottom part 7 of the inner casing 5.

Naturally the features described may be independently provided from one another.

In practice the materials used and the dimensions can be chosen at will according to requirements and to the state of the art.

The invention claimed is:

1. A method for removing an inner casing from a machine having an outer casing, an inner casing within the outer casing, and a rotor within the inner casing, the rotor having a longitudinal axis, the method comprising: removing a top part of the outer casing, removing a top part of the inner casing, removing a bottom part of the inner casing, before removing the bottom part of the inner casing: connecting the bottom part of the inner casing to the rotor, such that the bottom part of the inner casing is supported by the rotor, then rotating the rotor around the longitudinal axis to make the bottom part of the inner casing accessible.

2. The method according to claim 1, wherein connecting the bottom part of the inner casing to the rotor includes providing a form fitting and/or friction connection.

3. The method according to claim 2, wherein providing a form fitting and/or friction connection includes: removing a rotor blade from a rotor groove, providing a support having an end with a profile corresponding to the profile of the rotor groove, connecting the profiled end of the support into the rotor groove of the removed rotor blade, and connecting an opposite end of the support to the bottom part of the inner casing.

4. The method according to claim 2, wherein providing a form fitting and/or friction connection includes screw fitting of the at least one support at least to the rotor.

5. The method according to claim 4, wherein screw fitting of the support(s) to the rotor includes screwing the supports to front and/or rear surfaces of the rotor.

6. The method according to claim 3, further comprising removing a second rotor blade from a second rotor groove, providing a second support having an end with a profile corresponding to the profile of the second rotor groove, connecting the profiled end of the second support into the second rotor groove. of the removed second rotor blade, and connecting an opposite end of the second support to the bottom part of the inner casing.

7. The method according to claim 1, further comprising connecting a ring sector to the bottom part of the inner casing.

8. The method according to claim 2, wherein comprising providing the form fitting and/or friction connection does not include clamping the rotor circumference.

9. The method according to claim 1, further comprising after connecting the bottom part of the inner casing to the rotor, adjusting the position of the bottom part of the inner casing with respect to the rotor.

10. The method according to claim 9, wherein adjusting the position of the bottom part of the inner casing includes spacing the inner casing from the rotor.

11. The method according to claim 10, wherein spacing the bottom part of the inner casing from the rotor includes radially displacing the bottom part of the inner casing.

* * * * *